United States Patent [19]
Roberts et al.

[11] 3,772,516
[45] Nov. 13, 1973

[54] MAGNIFIER SCANNER TRACKER

[75] Inventors: Richard E. Roberts; George Lamar Harmon, both of Winter Park; Michael J. Colpack; Burton J. Askowith, both of Orlando, all of Fla.

[73] Assignee: Martin Marietta Corporation, New York, N.Y.

[22] Filed: Nov. 6, 1969

[21] Appl. No.: 874,538

[52] U.S. Cl. ............... 250/201, 178/7.81, 178/7.92, 250/234, 178/540 S
[51] Int. Cl. ................................................ G01j 1/20
[58] Field of Search ................... 250/201, 203, 234; 244/14; 178/7.81–7.92, 540 S; 356/29

[56] References Cited
UNITED STATES PATENTS

| | | |
|---|---|---|
| 3,175,089 | 3/1965 | Talley et al. ............................ 178/6 |
| 3,521,071 | 7/1970 | Speller ................................. 250/203 |
| 3,448,271 | 6/1969 | Aldrich et al. ....................... 250/203 |
| 3,085,158 | 4/1963 | Miller .................................. 250/203 |
| 2,989,891 | 6/1961 | Rockafellow ........................... 88/14 |

*Primary Examiner*—Benjamin A. Borchelt
*Assistant Examiner*—N. Moskowitz
*Attorney*—Julian C. Renfro and Gay Chin

[57] ABSTRACT

An electro mechanical optical device utilizing concentric multiple optical paths through which light indicative of a target scene can be displayed upon photosensitive devices, with means for processing voltage analogs of the light to provide positional information for controlling the positioning of the device, as well as means for deriving a plurality of scans indicative of the target scene, which scans can thereafter be used in other related devices.

17 Claims, 14 Drawing Figures

INVENTORS
RICHARD E. ROBERTS
GEORGE LAMAR HARMON
MICHAEL J. COLPACK
BURTON J. ASKOWITH

BY *Julian C. Renfro*

ATTORNEY

INVENTORS
RICHARD E. ROBERTS
GEORGE LAMAR HARMON
MICHAEL J. COLPACK
BURTON J. ASKOWITH

BY Julian L. Renfro
ATTORNEY

INVENTORS
RICHARD E. ROBERTS
GEORGE LAMAR HARMON
MICHAEL J. COLPACK
BURTON J. ASKOWITH

BY Julian C. Renfro
ATTORNEY

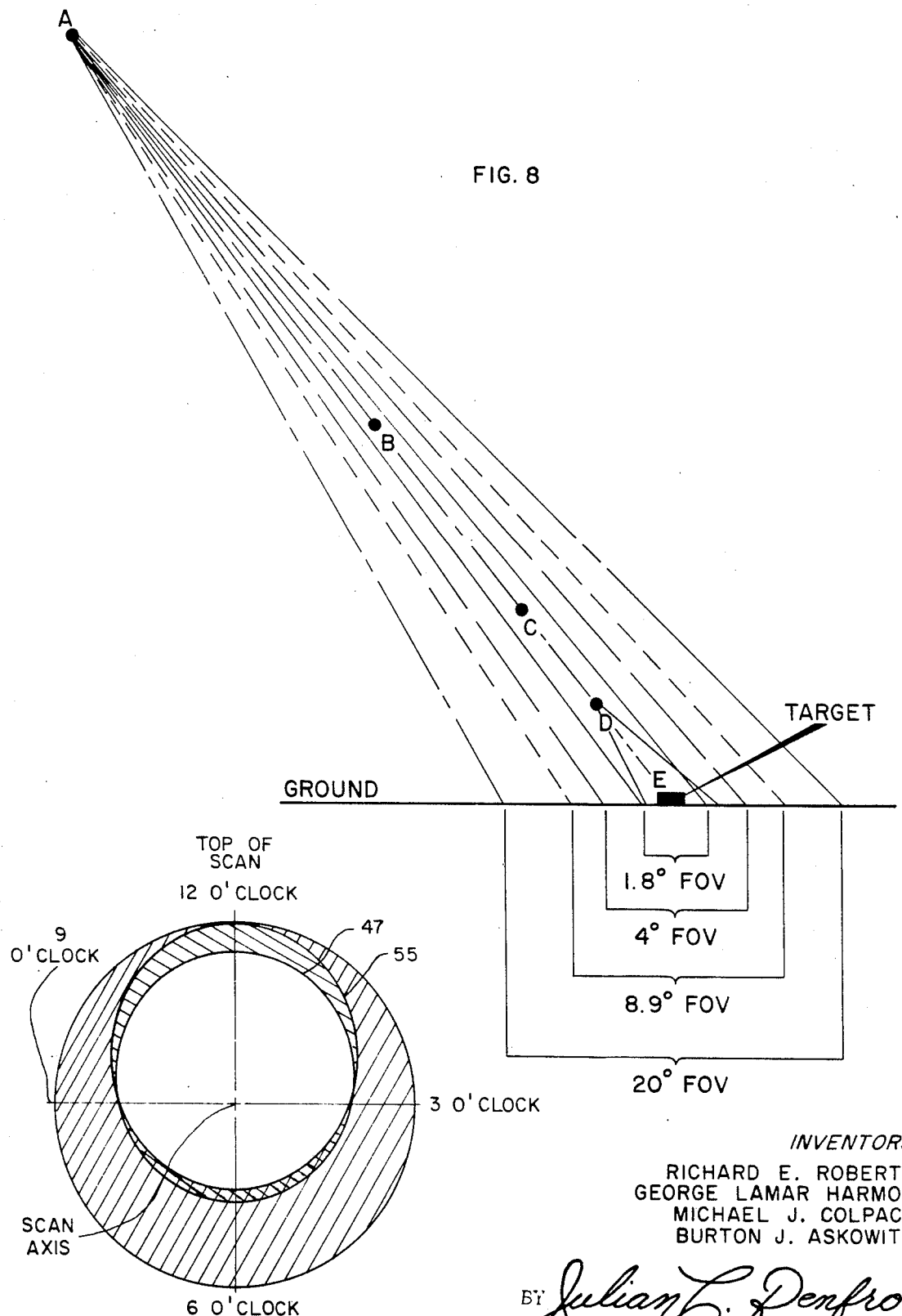

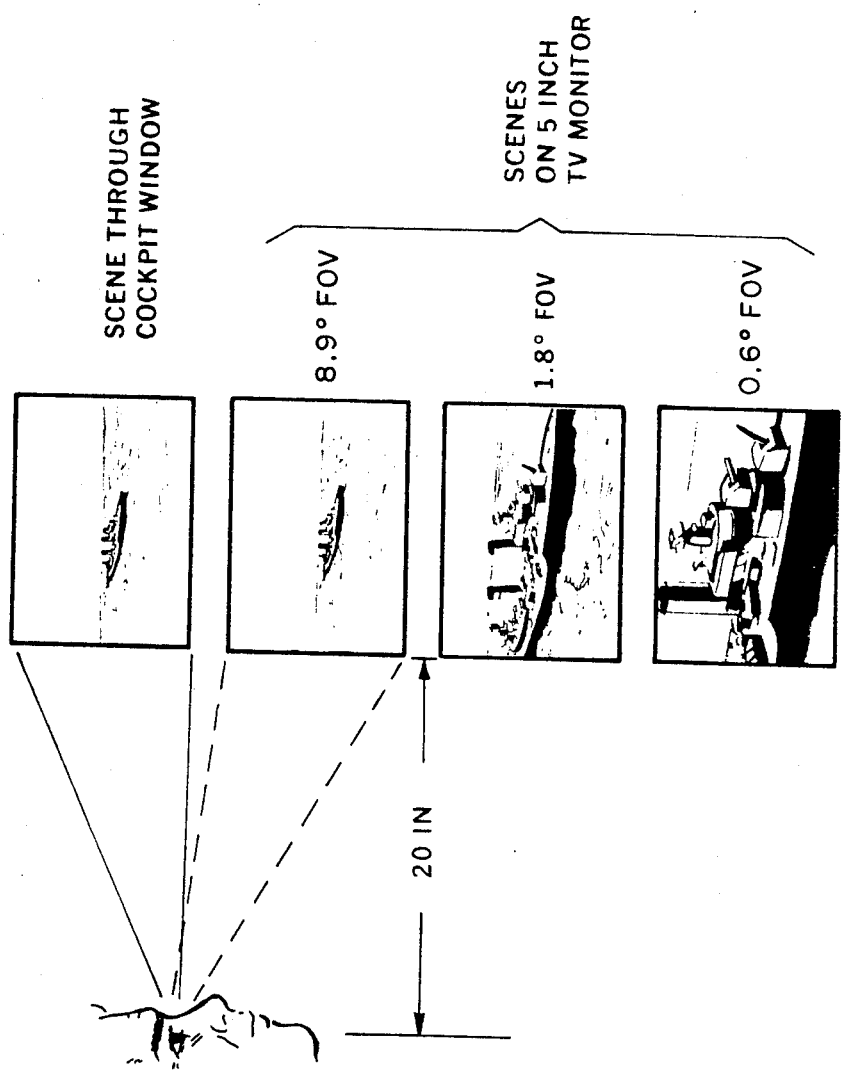

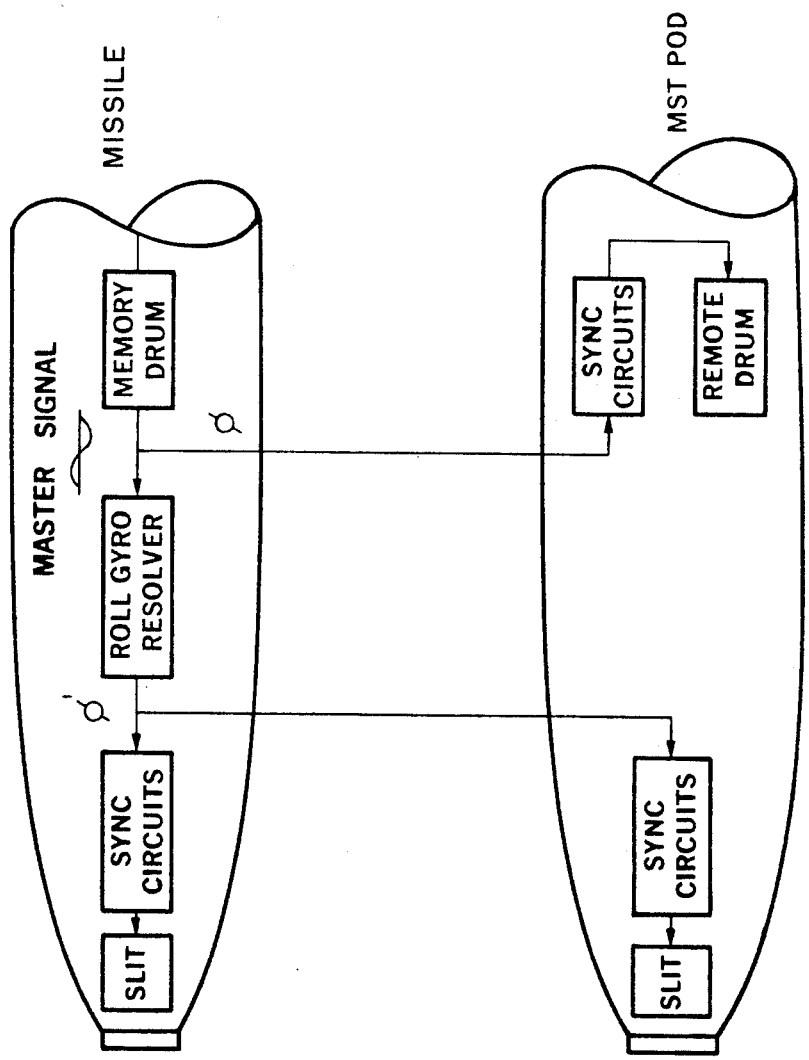

MAGNIFIER SCANNER TRACKER

This invention relates to a system basically designed to provide multiple optical field of view references to an area correlation guidance system, and more particularly to a magnifier scanner tracker device that is operator positioned to point at a selected aim point, and which thereafter functions automatically to provide a plurality of reference forming progressively smaller area representations of the aim point.

In the co-pending patent application of Emmons, et at., entitled, PRESTORED AREA CORRELATION TRACKER, Ser. No. 873,864 filed Nov. 4, 1969 and assigned to the assignee of the present invention, a novel prestored area correlation tracker was taught, which involves multiple concentric field of view apparatus in combination with apparatus for memorizing multiple digital representations of a target scene and logic apparatus to utilize such representations for the purpose of recognizing the target scene and accurately maintaining a desired aim point in the scene.

Although the above-referenced PACT invention may in one embodiment be utilized with prestored references obtained from an ancillary device designed to accurately scale reconnaissance photographs, in accordance with a primary version of the PACT invention, a plurality of prestored references may be derived in flight and immediately placed aboard a PACT equipped missile so as to make possible an exceptionally accurate technique for guiding the missile to a target of opportunity or the like.

It is a primary purpose of the present invention to provide a precision stabilized airborne reference gathering source for utilization in conjunction with a PACK type missile, such that a plurality of prestored references representing the appearance of the aim point area at an initial range and at successively closer ranges to the desired aim point can be derived and utilized in a pre-established order for missile guidance.

Prior to this invention other means for stabilizing optical devices had been provided, and for example certain high powered telescopes have been provided with a rate stabilized platform but these had very definite limitations in that when small field of view arrangements were used, it was very difficult to have the optical device point directly at the desired target, and the time required to search and find this desired target becomes inordinately long. One approach to solve the time problem has been the use of other pointing devices to direct the small field of view optical device, thereby reducing the region over which the small field of view device must search. Some efforts have involved the use of an optical device directed by a radar arrangement such that the picking up of an unknown object optically after a radar sighting could be simplified. However, the radar units typically had a very wide beams, and frequently the radar directed optical device could not find the radar sighted object when the optical device was being used in its narrow field of view. Some improvement in the pointing of high powered optical devices was, however, brought about by use in conjunction with a point or contrast type tracker, but these have had other disadvantages.

Our invention utilizes a correlation tracker for stabilizing our novel optical arrangement on a line of signt to the target, and by means of multiple field of view presented to the operator via a television display, and his reorientation of the gimballed magnifier, allows for successively more precise pointing, keeping the target within the displayed field of view as the magnification of the scene increases. Also, our device provides sufficient stability that a plurality of references of the target or aim point can be derived and used by a PACT missile. Stability in this instance is most important in that the reference must be concentric about the same point and must be obtained very rapidly, such that during the period of scanning, gimbal motion is kept to a minimum.

Although stabilization of our optical platform is enchanced by the use of gyros which measure spatial rates, our utilization of a novel correlator device which stabilizes with respect to the target enables for the first time the high degree of stabilization necessary for the magnifier Scanner Tracker device to perform all of its functions with respect to the target area and the related missile.

With regard to vital details of the present invention, it is a magnifier to the extent that it provides to a scanner and to a television system, two selectible optical fields of view of the target scene at different magnifications. These optical fields of view as noted above are provided to the operator's display and to the scanner. The optical images provided to the television system concerned with the display can thence be further magnified by electronic magnification, so that four fields of view can be advantageously provided to the operator. In a similar fashion, the optical images provided to the scanner can be mechanically scanned over two regions by a novel Shoch shutter device to provide four fields of view.

The system is a scanner to the extent that it provides to the missile a plurality of digitized references of the selected scene, as noted above. In the above mentioned embodiment, our scanner has the capability of providing four digitized scans that are corrected by the use of image shaping masks to compensate for geometric scene mismatch between the MST and the PACT. This scanner is synchronized with the memory system in the related missile such that whatever data position occur in the scanner occur in the same relative positions in the missile.

Our device is a tracker in that it combines the functions of memory, correlation function and servo, and performs the mission of tracking a previously scanned reference where this reference is obtained by means of its own scanner or where this reference is obtained as missile live scan data. In both of these instances our MST uses the references as old data and compares it with what it sees through its optics, thus steering its gimbals to the point about which the references were made.

Thus we have provided an airborne instrument comprising a correlator scanner having multiple fields of view and a multiple field of view television system than enables a pilot or operator to assess and correct the aiming point of the correlator scanner. It should be noted that the aforementioned television system assists greatly in attaining alignment of the four references with respect to the original pilot-selected target of opportunity.

A correlation angular error position measurement system is included in the MST equipment. Its function before missile launch is to provide the operator a precision position control loop by which he may aim the scanner axis at the desired target. Also, at the time the first reference, which determines the final PACT correction, is generated, the MST scanner is being stabilized by the correlator tracker. The subsequent three less important references are generated in a rate stabilized mode. The correlator stabilization is accomplished by comparing the reference pattern data generated around each memorized point as the pilot moves the aiming point closer to the selected target, with the currect data from the MST scanner.

Our novel device also utilizes a servoed gimbal arrangement that gives the optical axis of the MST dynamic freedom from the rotations and other movements of the carrying aircraft. Also important is the capability given to the pilot of being able to easily align the optical axis of the MST with the target.

The over-all system gain of the MST is determined not only by the gain of the servo and the gain of the correlator angular error measuring system, but also by the operator's hand control response as he views the particular field of view employed in the television display. The over-all system gain is a product of these three functional elements and has a maximum value which must not be exceeded if the over-all system is to remain stable throughout all environmental conditions. To insure a constant and proper system gain, a gain change mechanism is utilized in both the pitch and yaw channels of the servo wherein a gain change accompanies each optical field of view change and is inversely proportional to the ratio of the magnification involved in the field of view change.

It is a principal object of this invention to provide multiple prestored references to a missile or other vehicle for use in accurately directing the path of travel of the missile or vehicle.

It is another object to provide such a device for supplying such references for use in range closure of such a missile or vehicle.

It is a more detailed object of this invention to provide a highly effective electro optical mechanical device that will serve to enable an operator to precisely position a multiple field of view scanner that will function to provide a plurality of references indicative of the appearance of the area around an aim point.

It is another object of this invention to provide a stabilized optical magnifier device for detailed visual investigation of a selected area.

It is another object of our invention to provide a device that can be selectively oriented to match the orientation of various sensor devices for magnified visual investigations.

It is another object of our invention to provide a technique for use in causing a second device to point precisely at the same selected scene or area as does a first device.

These and other objects, features and advantages of our invention will be more apparent from a study of the appended drawings in which:

FIG. 8 is a diagram showing the fields of view as utilized by our MST in generating a plurality of reference signals, and missile positions in a trajectory in which these references are used;

FIG. 8a is a composite view of optical image planes depicting two optical masks used for proper shaping of scan references made by our MST;

FIG. 9 is a pictorial representation of a target scene indicating the relative magnifications of a target as observed by an operator viewing his television display;

FIG. 11 is a simplified diagram depicting the manner in which the elements of an MST system are synchronized with the elements of a PACT missile.

DETAILED DESCRIPTION OF FIGS. 1 THROUGH 7

Figure 1:
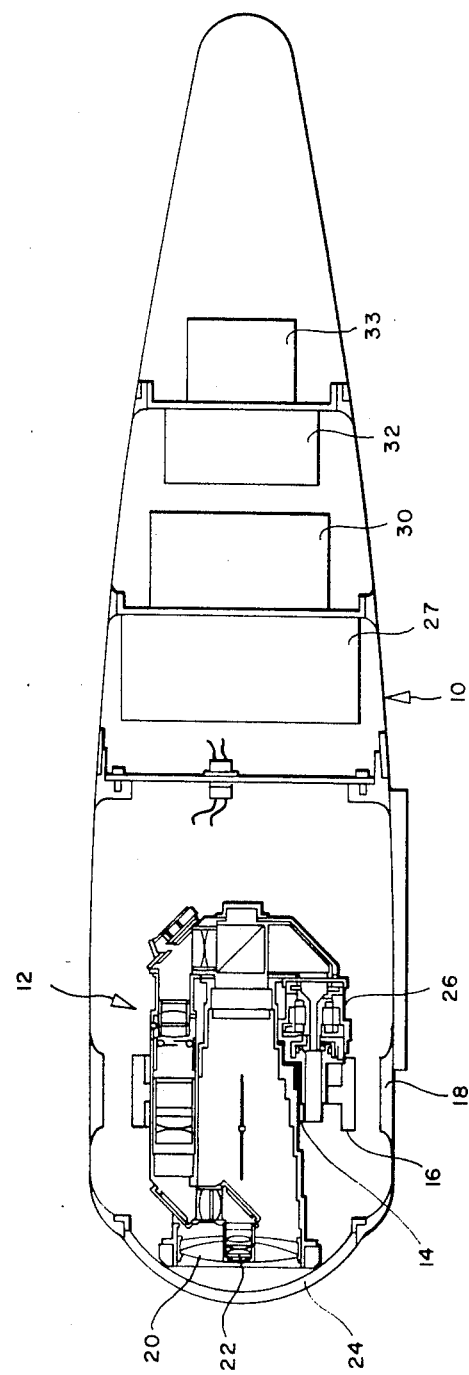
FIG. 1 is a side elevational view of a magnifier scanner tracker system in accordance with a preferred embodiment of our invention.

Turning to FIG. 1, it will be seen that a side elevational view of the overall magnifier scanner tracker device 10 is there shown in a pod for illustrative purposes, with the gimballed tracker assembly 12 disposed in a forward portion of the MST pod. The tracker assembly 12 is gimballed by means including a yaw gimbal arrangement 14 that may be regarded as involving the housing 15 depicted in FIG. 2. Suitable upper and lower trunions (not shown) extend into rotatable contact with pitch gimbal 16, and latter gimbal in turn is mounted by the use of left and right trunions in a ring assembly 18 that is secured in a forward portion of the pod. Thus, the tracker assembly 12 may be selectively moved in yaw and pitch so that objective lenses 20 and 22 on the forward portion of the tracker can be caused to point simultaneously at the desired target or aim point. A transparent dome 24 is disposed in front of the objective lenses so that the intended target can be optically visible to the tracker.

As will be more apparent as the description proceeds, the tracker assembly is basically designed to provide multiple optical field of view references to a Prestored Area Correlation Tracker disposed in a related missile, with the gimballed tracker assembly being manually positionable by means of a servo system to point at a selected target. A closed loop television system is provided to help the pilot or operator in this effort.

The light entering the objective lenses 20 and 22 passes through one or the other of two principal optical paths and is caused to be directed to a scanner assembly 26, which involves a Shoch shutter assembly 68, fiber optics 60, and a photodetector 70, such as a photomultiplier tube. This entering light is caused to be directed in four different modes onto the face plate of the photomultiplier tube 70, by which the light energy is converted into an analog representation of the target scene. This analog information is then data processed by the correlator electronics 32 indicated in FIG. 1, to be sent to the area correlation guidance system of the accompanying missile for use as reference signatures of the target in various fields of view. The MST arrangement in accordance with this invention thus provides four separate fields of view to the missile, where the information is used in accordance with the Store Down Stream invention described at length in the co-pending patent application Ser. No. 873,864 of Emmons et al., entitled PRESTORED AREA CORRELATION TRACKER, and assigned to the assignee of the present invention.

In FIG. 1 is a representation of the television video recorder 27 utilized to record the video presented to the pilot or operator of the aircraft equipped with an MST while the data pertaining to the target scene is being acquired. This device 27 also is able to record the position in which the gimbals of the PACT device in the missile are pointing. Thus, after the missile has acquired the scene and is tracking, the live scene data is sent to the MST tracker to be used as reference data so that the MST gimbals will point in the same heading as the PACT gimbals in the missile. In this manner the observed video represents the target scene as observed by the missile.

In FIG. 1 a remote memory 33 is also represented, which is a device associated with the correlation electronics when the MST system is in the aiming track mode, th provide the means by which the error signals are developed for steering the MST gimbals. The television electronics represented at 30 in FIG. 1 involves the apparatus used in generating the video presentation to the operator, and also contains the gimbals servo electronics used in positioning the MST gimbals during the various modes of operation.

Figure 2:
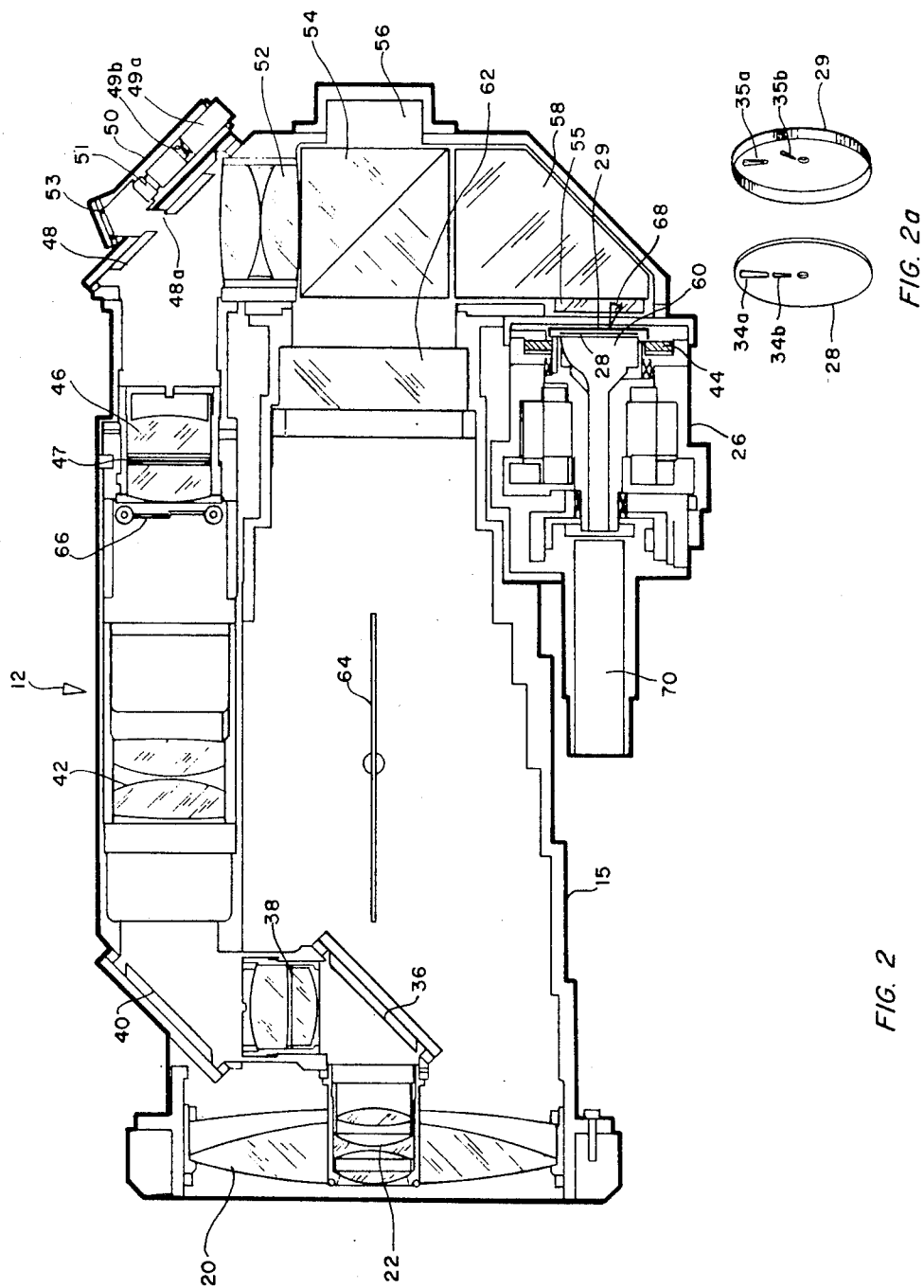
FIG. 2 is an enlarged cross sectional view of a gimballed tracker assembly of a preferred embodiment of our MST device.

Turning now to FIG. 2, it will be noted that we have there depicted the gimballed tracker assembly 12 in a cross sectional manner revealing a desired positioning of the lenses, mirrors and other optical components designed to bring about the directing of light from the target area onto the Shoch shutter assembly 68 and the face of the photomultiplier tube 70. Light enters through objective lenses 20 and 22, as previously mentioned, with lens 20 in this instance being a 6½ inch diameter air-spaced achromatic doublet having a 20 inch focal length, and designed to provide a small field of view capability for the tracker. A hole is ground through this lens concentric to the optic axis and in this aperture is disposed the smaller objective lens assembly 22, which is in the form of a Taylor triplet having a 4 inch focal length and serving to provide a large field of view capability for the tracker.

Figure 4:
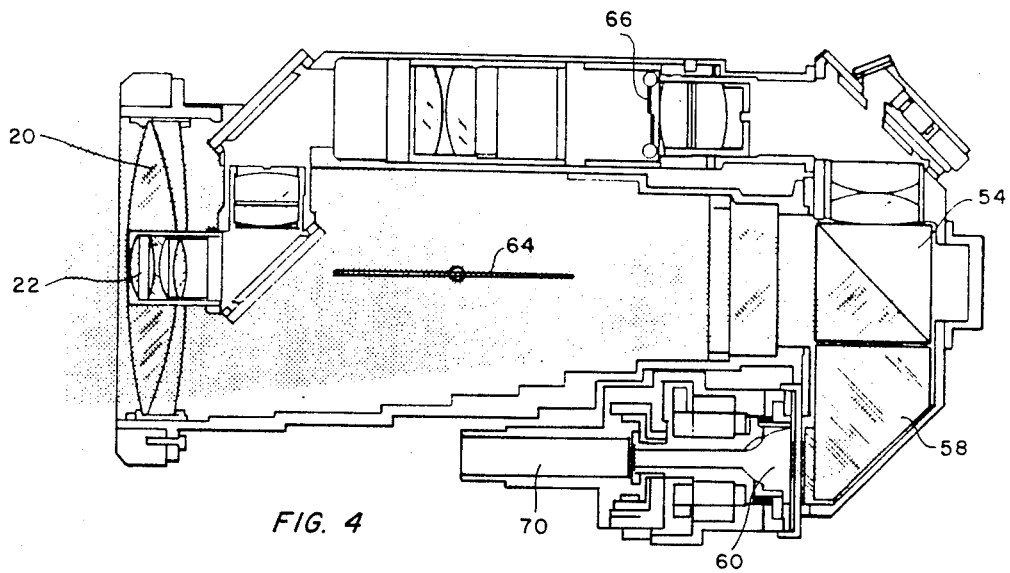
FIGS. 4 and 5 show light paths associated with a 20 inch focal length optical system.
Figure 5:
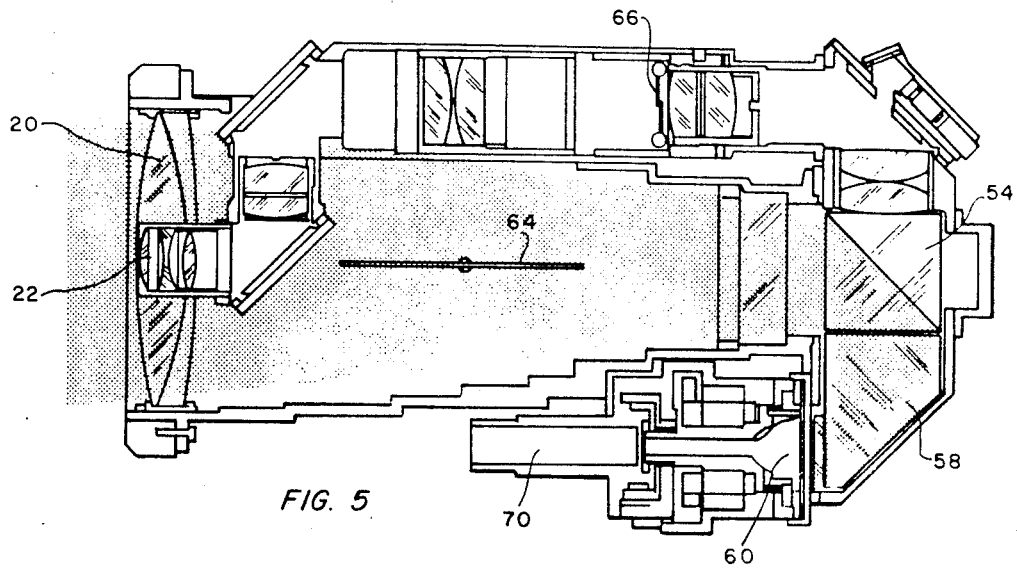
Figure 6:
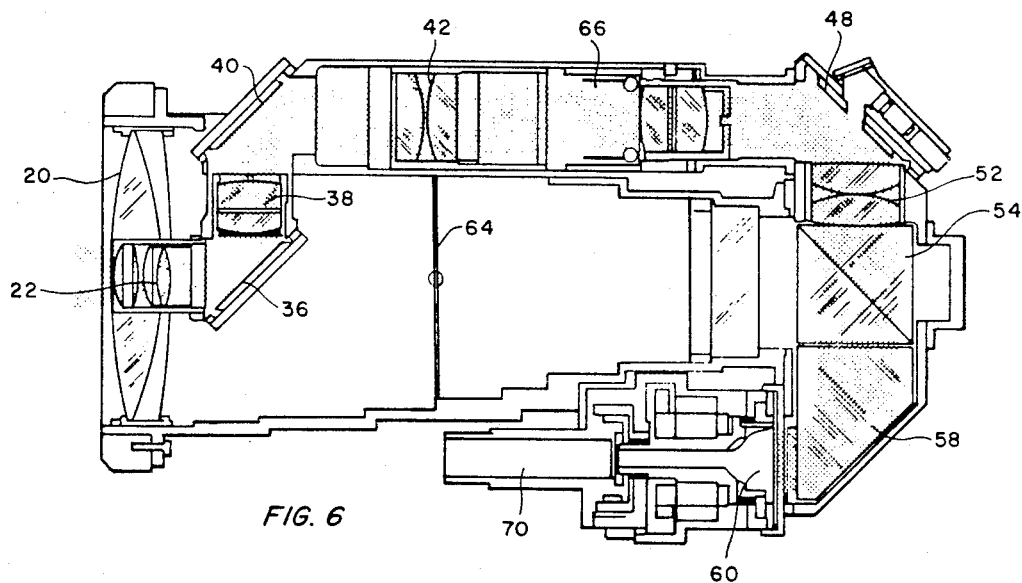
FIGS. 6 and 7 show light paths associated with a 4 inch focal length optical system.
Figure 7:
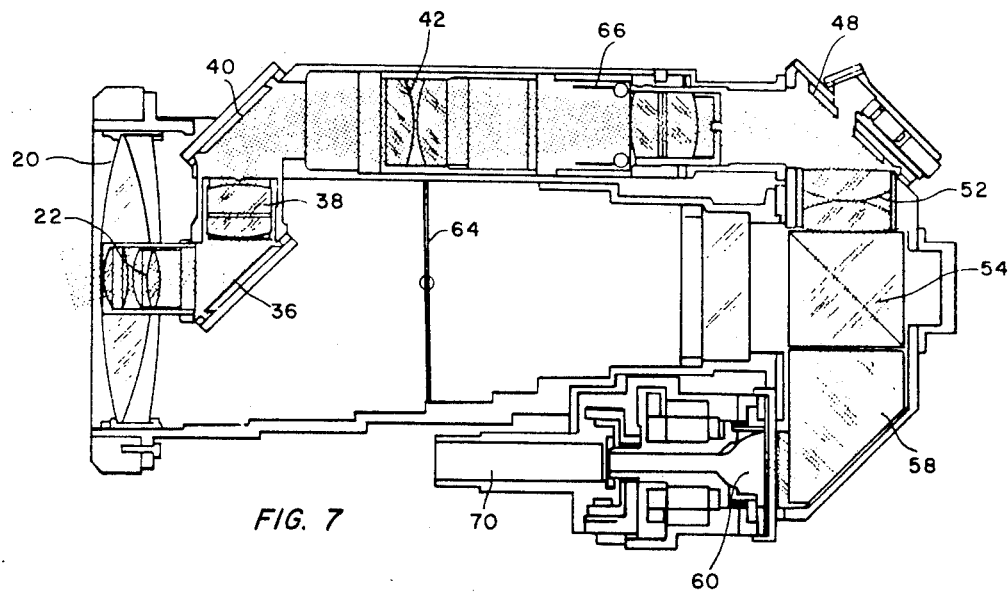

As will be noted from contrasting the light paths depicted in FIGS. 4 and 5 with the light paths shown in FIGS. 6 and 7, the light entering the objective lenses 20 and 22 is directed along either of two optical paths. Differentially operable shutter members 64 and 66 are utilized such that only the light passing through a selected one of the two objective lenses is at any moment allowed to reach the scanner assembly 26.

Considering first the small field of view optical paths shown in FIGS. 4 and 5, it will be noted in this instance that the large baffle member 64 is in the open position, thus allowing the light entering large lens 20 to reach the parallel plate 62, which is a glass member say 1 inch in thickness and utilized as a corrective plate to extend the 20 inch focal length sufficiently to bring the 4° field of view onto the image plane represented by the rotating Shoch shutter assembly 68. The baffle member 64 is in the nature of a butterfly valve placed close enough to its objective lens 20 that it throws no significant shadow onto the image plane of the scanner. After passing through the member 62, the light falls upon the beam splitter 54 and the reflected portion is redirected 90° so as to fall upon right angle prism 58, which in turn causes the light to be directed upon the Shoch shutter assembly 68 described at length hereinafter.

During the time that the light has been passing through the large lens 20, light entering small objective lens 22 has been blocked by the shutters 66 from reaching the scanner assembly 26. Inasmuch as the shutter arrangements 64 and 66 are differentially operable, when the shutter or baffle 64 has been moved to the blocking position shown in FIGS. 6 and 7, the shutters 66 are opened, thus allowing the light passing through lens 22 to be displayed upon the image plane of the scanner as represented by the Shoch shutter arrangement 68.

More specifically, the light after passing through lens 22 is reflected by mirror 36, and caused to turn 90° so as to pass through lens assembly 38. Lens 38 comprises two standard cemented achromatic doublets, mounted with negative elements internal. The front element of the lens assembly 38 has a focal length of approximately 4 inches, whereas the rear element has a focal length of approximately 5 inches. Thus, the lens 38 serves as the first field lens, and lies approximately in the back focal plane of lens 22.

After leaving lens assembly 38, the light is turned by mirror 40 approximately 90°, and caused to pass through lens assembly 42. This latter lens utilizes a pair of standard cemented achromatic doublets of 5½ inch focal length involving the two positive elements mounted to face each other internally. The lens 42 serves as the first transfer or imaging lens of the large field of view relay system.

After passing through the open shutters 66, light then passes through lens assembly 46, which differs from lens assembly 38 in that both the front and back elements have a focal length of 5½ inch, and in that a reticle 47, approximately 0.040 inch thick, is mounted between the two lens elements and arranged to provide a center cross hair and an elliptical mask whose function will be described hereinafter. Lens 46 serves as the second field lens.

Figure 3:
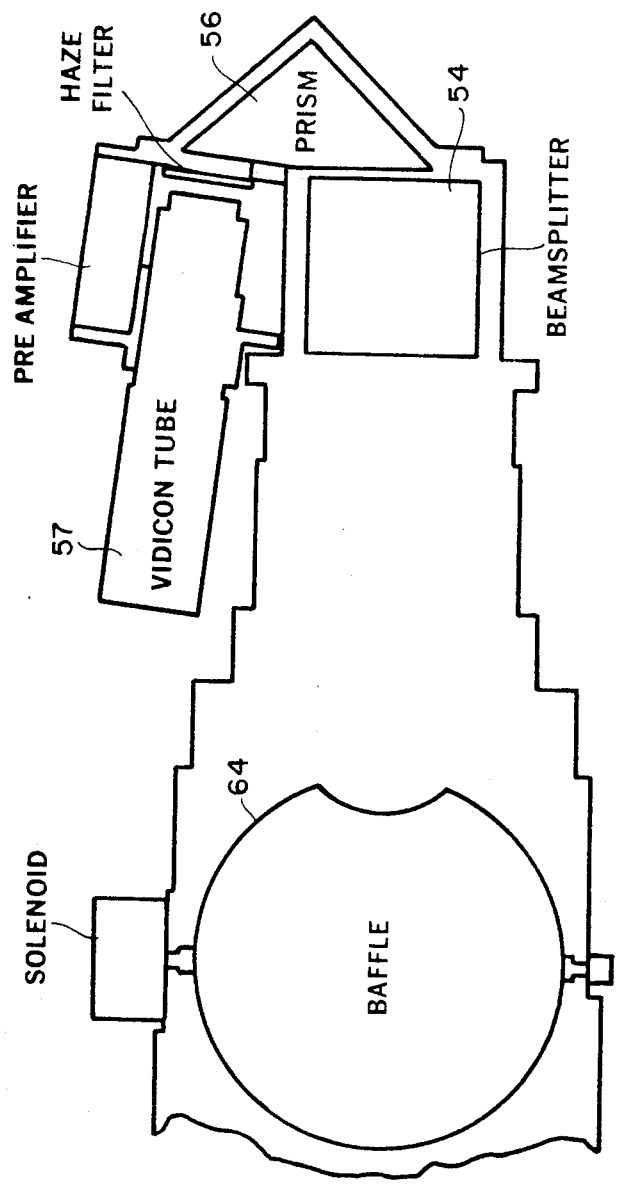
FIG. 3 is a cross sectional view of a portion of the device shown in FIG. 2 as viewed from above.

After passing through the lens assembly 46, the light is redirected by mirror 48 onto lens assembly 52, which is identical to lens assembly 42 and serves a similar (second) transfer function and also an erecting function. The light thereafter passes through beam splitter 54, which is a dielectrically coated cubic beam splitter or semi-mirror approximately 50 percent transmissive and 50 percent reflective in the visible spectral region. Some of this light is reflected onto prism 56 visible in FIGS. 2 and 3, which is a modified porro prism whose function it is to guide a portion of the beam onto the vidicon tube 57 shown in FIG. 3, utilized for a subsequent presentation on a television monitor. Light is also directed onto right angle prism 58, which serves to image the target scene onto the Shoch shutter assembly 68. The light that is passed by the Shoch shutter assembly is transmitted by fiber optics 60 to the face of the photomultiplier tube 70.

It should be noted at this point that the Shoch shutter is principally constituted by a pair of rotatable disks 28 and 29, as depicted in FIG. 2a in this application, and as described at length in the copending patent application of Shoch and Harmon, Ser. No. 783,058, filed Dec. 11, 1968, entitled SHIFTABLE SCANNER APERTURE, refiled Nov. 27, 1970 as Patent application Ser. No. 90,781, and assigned to the assignee of the present invention. It will be noted from FIG. 2a that disk 28 is provided with a pair of radially disposed slits 34a and 34b, whereas disk 29 is provided with radial apertures 35a and 35b, with the slits and apertures being disposed such that 34a and 35a can on occasion be lined up to provide a large field of view, and when disk 29 has been rotated for a few degrees relative to disk 28, the slit 34b can be caused to line up with aperture 35b so that the small field of view is provided.

As was discussed by ths use of the small reference numerals in the aforementioned Shoch and Harmon patent application as well as in the PACT invention of Emmons et al., the disk 29 is provided with its outer portion disposed adjacent a toroidally shaped coil 44 through which current on occasion can be caused to pass. This coil serves as a brake coil serving to cause the disk 29 to move relatively to the disk 28 while the two disks continue to spin at say 3,600 rpm. A suitable spring is provided to keep these disks normally in one relative position such as with the slit 34a and the aperture 35a in alignment, thus to enable the large field of view arrangement to be brought about. When the coil 44 is energized, this causes a drag on disk 29 that in turn causes the spring bias to be overcome, and the disk 29 to move relative to the disk 28 to the extent permitted by a pin and slot arrangement. As will be appreciated, the slot is of a certain length so that the only two relative positions in which the disks can be are either with the slit 34a and aperture 35a in alignment, or else with slit 34b and aperture 35b in alignment.

With reference to the aforementioned PACT invention of Emmons et al., it should be noted that despite the usage of identical reference numerals insofar as the Shoch shutter portions are concerned, the relationship of the slits and apertures of that arrangement is different from the present one. More particularly, the large slit (and aperture) with respect to the small slit (and aperture) are in ratio of 5 to 1 in the PACT invention, whereas the large slit (and aperture) with respect to the small slit (and aperture) in the present invention are in a ratio of $\sqrt{5}$ to 1.

As should now be apparent, the use of the two light paths in conjunction with the two-position Shoch shutter makes possible a four field of view capability of our device. More particularly, FIG. 4 shows the baffle 64 in the open position and the Shoch shutter in the small field of view position, usch that light passes from the small field of the view lens 20, through the small radius of the Shoch shutter and thence onto the face of the photomultiplier tube 70, thus amounting to a 1.8° field of view.

FIG. 5 shows the same basic light path, but with the Shock shutter in the large field of view position, thus bringing about a 4° field of view.

Turning now to FIGS. 6 and 7, it will be noted that shutter 66 is in the open position, thus allowing light from the large field of view lens 22 to reach the Shoch shutter 68. In FIG. 6 the device 68 is in its large radius condition, which enables a 20° field of view to be obtained, whereas in FIG. 7, the device 68 is in its small radius condition, which enables an 8.9° field of view to be obtained.

The arrangements depicted in FIGS. 4 through 7 thus enable 1.8°, 4°, 20° and 8.9° fields of view to be created, with the arrangements and sequences just explained being such as to minimize the amount of switching of components necessary in the MST in order that the four fields of view may be rapidly obtained.

It should be noted in FIG. 2 that a dark-field reticle device 50 is provided to project a luminous crosshair for both the large and small fields of view seen by the pilot or observer. A lamp 49a is disposed to direct a proper amount of light through a very small aiming reticle 49b, and thence through lens 51 onto a mirror 53 disposed to direct the image through elliptical hole 48a in mirror 48 and through components 52 through 56 onto the faceplate of vidicon 57. The hole 48a should be noted to be very small in area as compared with the area of mirror 48. This luminous reticle can be easily seen at the center of the television monitor, and is important in the aiming of the scanner. However, this reticle is not seen by the photomultiplier tube 70 inasmuch as it falls adjacent the hub portion of the Shoch shutter, and does not pass through the slits and apertures. We found it necessary to have a dark field bright projected reticle, due to scene brightness.

Since the operator must have presented to him the target position relative to the scanner 26, a boresighted reticle and a TV display are employed. In contrast with the optical path to photomultiplier 70, which utilizes a Shoch shutter assembly 68 to obtain four fields of view, the optical path to the vidicon 57 only uses the two fields of view obtained by the selective use of the shutters 64 and 66. As described before, light from both optical paths reaches the beam splitter 54, which diverts approximately 50 percent of the light to the vidicon via porro prism 56. Thus, the shutters control the image magnification presented to the vidicon. The image diameter on the scanned vidicon target is 0.625 inches, and the closed loop television system has a 1.79° field of view or an 8.9° field of view, depending on shutter positioning. By reducing the scanned portion of the vidicon target to 0.208 inches diameter, in accordance with standard underscanning techniques, a 0.6° field of view is obtained. In FIG. 9 are shown the TV fields of view and a projected replica of the scenes as viewed by the operator(s).

DETAILED DESCRIPTION OF FIGS. 8 AND 8a

As previously discussed, an embodiment of the MST generates for use in the PACT four references of 20°, 8.9°, 4° and 1.8° fields of view of the target scene made at the missile launch range. The missile of course selectively uses these references at positions along its flight path as shown in FIG. 8, namely, A, B, C and D respectively. A consideration of the geometry in FIG. 8 when using a fixed acquisition field of view in the missile, namely 20° in this embodiment, will show that the nominal field of view angle of the references taken at point A will precisely match the missile's fixed field of view at points B, C and D only in the yaw plane, i.e., along a line perpendicular to the plane of the paper at point E in FIG. 8. However, a careful consideration will show that a circular scan by the MST will cause a mismatch of the reference scene as compared to the missile's scene at all positions along its trajectory except at the launch point and except in the yaw plane as mentioned above. An example of this mismatch is shown in FIG. 8 where at point D the missile field of view is shown. It is seen that the missile field of view exceeds the MST field of view above the target (at 12 o'clock as viewed from the aircraft) and is inside the MST field of view below the target (at 6 o'clock). Therefore a variable scanning slit radius in the MST is desirable to generate references which will match the scene as viewed by the missile fixed field of view.

The required variation in scanning slit radius is a function of not only the rotational scan angle as indicated above, but also of the missile trajectory depression angle and the point along the trajectory at which the reference will be used.

The correct variation of slit radius will generate an ellipse with the major axis in the pitch plane direction (6 o'clock - 12 o'clock) and the scan axis at the focus at the bottom of the ellipse, i.e., the 6 o'clock direction. The ratio of major to minor axis of the ellipse is dependent on the line of sight depression angle and the relative range at which the reference will be used by the missile. The ellipse becomes a circle (foci coincident) under two conditions, namely, when the reference is to be used at the launch range, and when the trajectory is vertical. For all other conditions the ratio of the major axis to minor axis increases the further from the launch point the reference is to be used by the missile and the greater the trajectory angle is from the vertical.

Since the last reference to be used by the missile, i.e., the nominal 1.8° field of view reference, is the most significant from a missile accuracy standpoint, the scanning radius for this field of view should be controlled as accurately as possible.

As noted above, the scanning radius should be constant (circular scan) for the first or 20° field of view reference in order to match the missile 20° field of view circular scan for initial acquisition. Also, for the missile follow tracking mode it is required that both the MST 20° and 4° fields of view match the missile's 20° and 4° fields of view, thereby dictating that the 4° field of view also have a circular scan. The 8.9° FOV reference should be corrected to the extent that the scan radius variation technique permits.

Since the 1.8° and 8.9° fields of view scans are generated with the small slit 34b, and the 20° and 4° fields of view scans are generated by the large slit 34a, only the small slit will be affected by masking.

An embodiment of structure which will provide a proper variation scan radius is an elliptically shaped optical mask. Since optical masks can only block light passage and not increase it, the arrangement of masks where more than one is required should be such that a second or subsequent mask establishes a smaller scan radius which would be within the bounds a larger radii mask. A further requirement is that the masks be located at image planes in order to effectively establish image boundaries. In our system the latter requirement dictates that the mask for the 1.8° field of view be located adjacent to the Shoch shutter assembly 68, since the only image plane in the 20 inch focal length path lies at this point. Therefore, mask 55, indicated in FIG. 2 and shown in FIG. 8a for the 1.8° field of view is positioned at this location. A mask to vary the radii of the 8.9° field view must be located such that it does not block the light for the 1.8° field of view but does affect the 8.9° field of view. Such a location is in the 4 inch focal length path. Mask 47, indicated in FIG. 2 and shown in FIG. 8a, is therefore positioned between elements of lens assembly 46, for the 8.9° field of view. Since the ratio of the major axis to minor axis is larger for the 1.8° field of view elliptical mask than for the 8.9° field of view elliptical mask (the 8.9° field of view mask is more nearly circular) the latter boundary falls within that of the 1.8° field of view mask except for a small region at the bottom of the scan as shown in FIG. 8a.

The embodiment shown portrays fixed shaped masks selected for an average missile trajectory angle say 25° from the horizontal. However, another embodiment could utilize one or more iris type vairable shape masks which could accommodate various trajectory depression angles and points of reference usage along the trajectory.

Figure 10B:
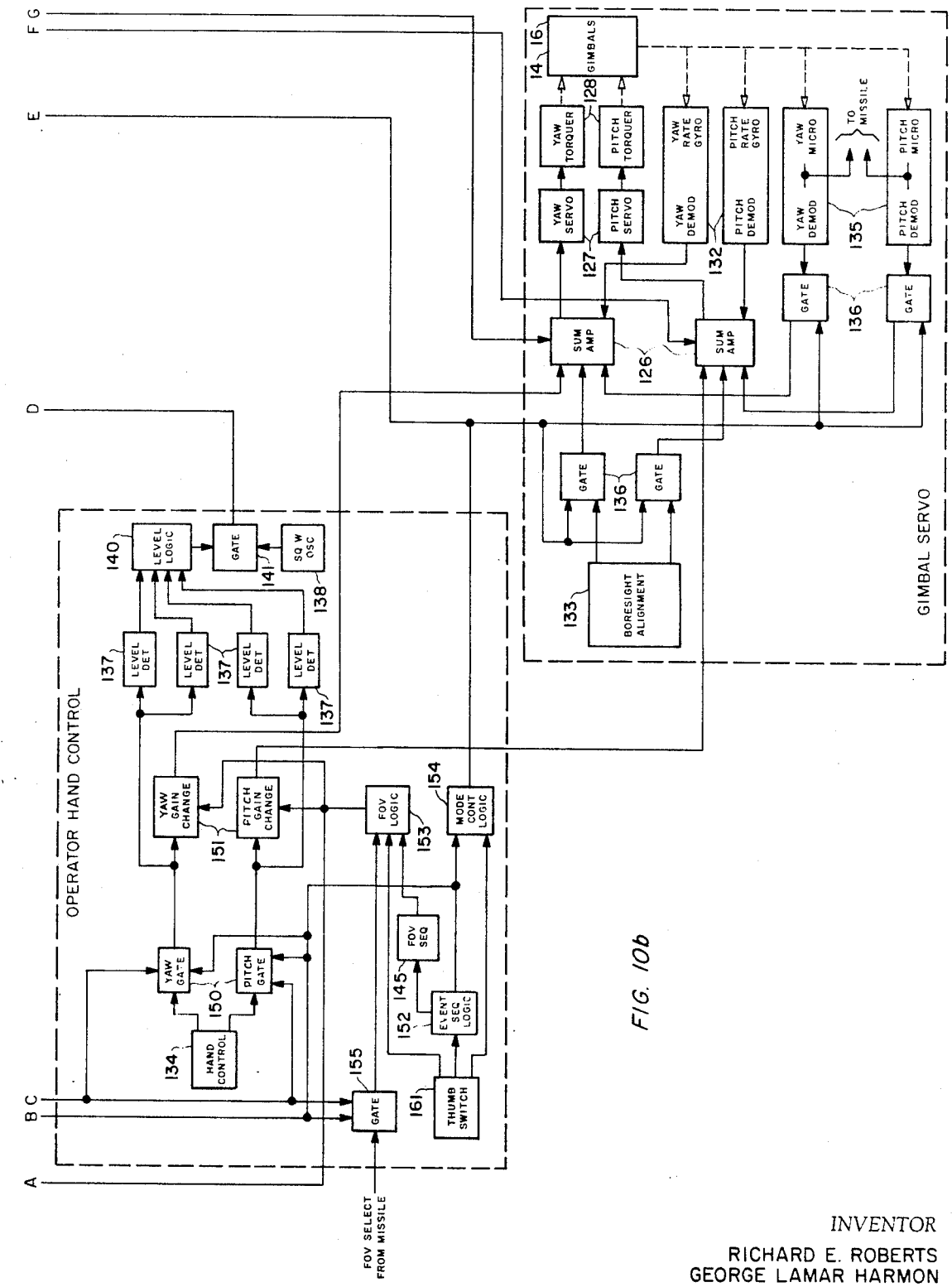
FIGS. 10a and 10b are a related pair of block diagrams of the principal functional elements of our MST system.
Figure 10A:
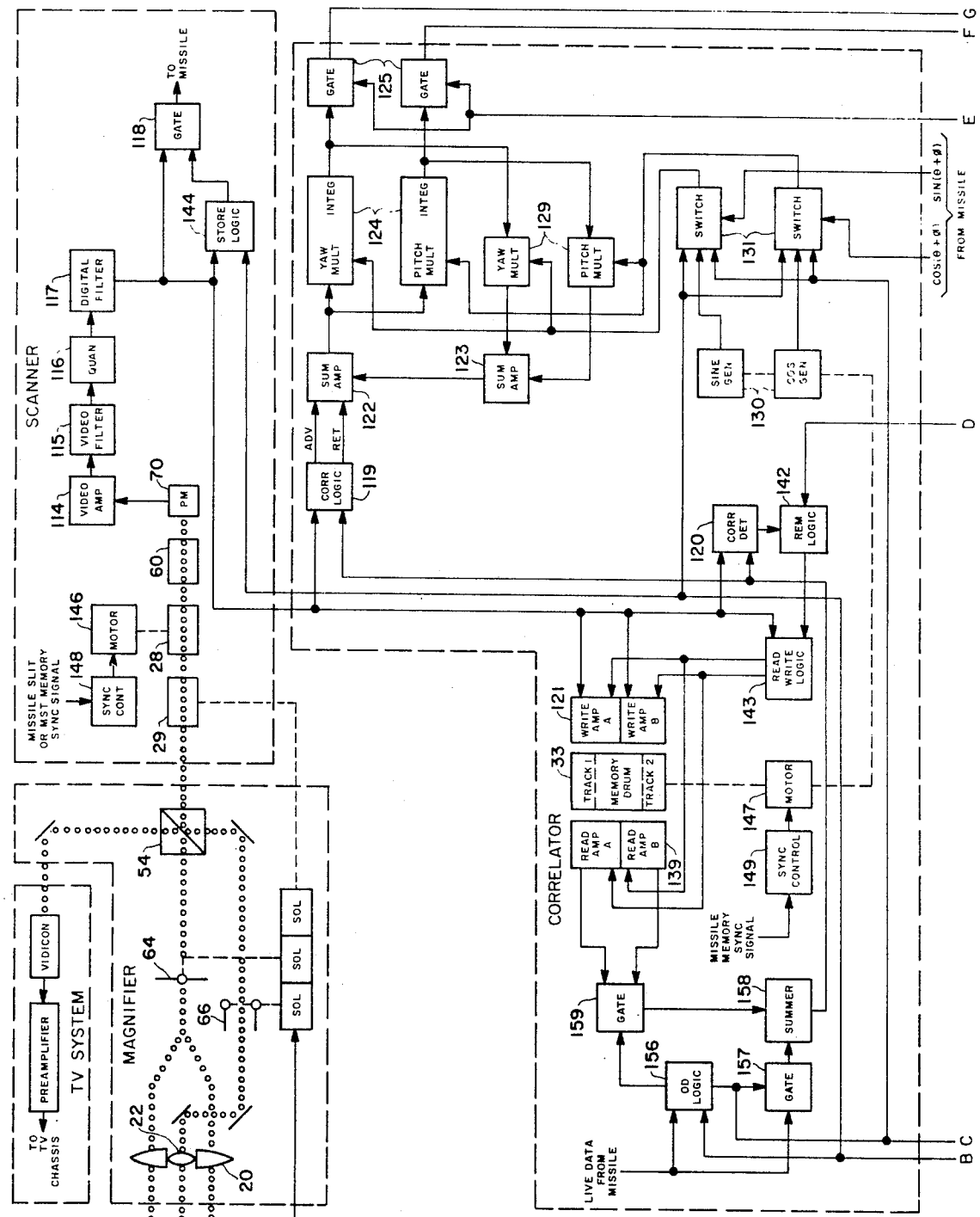

DETAILED DESCRIPTION OF FIGURES 10a and 10b

The functional block diagram of the MST involving FIGS. 10a and 10b is arranged to show functional groupings, i.e., Magnifier, TV System, Scanner, Correlator, Gimbal Servo and Operator's hand control. Each of these functional groupings will be discussed in turn.

The Magnifier grouping as represented by FIG. 2 contains the daul optical path optics, the shutters for switching optical paths, aiming reticle, and image shaping masks which provide the target scene to the TV system and Scanner. The TV system contains the vidicon, the video electronics, underscan electronics, the TV displays and the video recorder, and provides the target scene to the recorder and to the operator display.

The scanner grouping contains a representation of the Shoch shutter and rotating light pipe, as well as the photomultiplier and quantizer and electronics which provide a representation of the target scene in digital format to the correlator.

The Correlator grouping contains processing electronics, logic electronics and the memory unit which provides misalignment error signals to the servo.

The Gimbal Servo comprises pitch and yaw mechanical gimbals, servo electronics, torquers, microsyns, and rate gyros, providing realignment means for positioning the actual aim point to the desired aim point. The operator Hand Control grouping consists of the hand control, thumb switch, and mode and field of view logic electronics which provide control signals to the gimbal servos and mode logic to all other groupings.

The sequence of fields of view in this system is 1.8°, 4.0°, 20.0° and 8.9°, as previously mentioned. The operation of sequencing the fields of view by reversing the position of the baffles 64, 66 and rotating or manipulating the Shoch shutter disc 29 occurs in less than 325 milliseconds. In the upper left hand portion of FIG. 10a, these components are represented. The analog signal from the photomultiplier tube 70 from each of these scans is presented to a video amplifier 114, and the amplified video signal then goes to a video filter 115. The filter attenuates the 60 cps carrier as well as the noise and high frequency (> 3,000 cps) contents of the signal. The signal is then sent to a digital quantizer 116 which amplifies and digitizes the analog signal by means of a preset threshold in the quantizer amplifier. In one version of this invention, the threshold is set for zero. The processed signal (live data) is diode clamped to a logic level output for use with the digital filter 117.

After the signal has been processed by the quantizer 116, the logic lever signal from the quantizer is applied to the digital filter 117, which prevents any pulse smaller than 500 microseconds from being processed into the system. The signal then is applied to the correlation logic 119, which is represented in the Correlator portion of FIG. 10a. This same signal is also applied to a correlation detector 120, to the missile through a gate 118, and to the write amplifiers 121. The output of digital filter 117 is also applied to store logic 144, to preclude the reference pulse train to the missile from starting in the middle of a pulse. In a like manner the output of filter 117 is used in read write logic 143 to preclude the initiation of pulse train storage in memory 33 in the middle of a pulse. The correlation logic 119 serves to compare the digitized data with the reference data (old data) which is provided by a previous scan in the aiming tracking mode, or from the missile live scan in the missile follow tracking mode. Depending upon the time sequence of the data in terms of its relationship to the new data, an advance or retard pulse is obtained indicating a change in the target scene. These advance and retard signals are applied to an input summing amplifier 122 where they are multiplied by the D.C level output of the feedback summing amplifier 123. After the feedback signal has been applied to the input summing amplifier 122, the resultant output will be a series of pulses having variable length and height, which pulses are applied to the pitch and yaw multiplier integrators 124. A pitch and yaw error signal outputs of these integrators are sent through respective gates 125 and leads F and G to the itch and yaw servo summing amplifiers 126 shown in the Gimbal Servo portion of FIG. 10b. The gates 125 determine whether the correlator output data is used by the servo. Its use is selectable in the aiming tracking mode and required in the missile follow tracking mode. The pitch and yaw integrator output signals are also sent to respective pitch and yaw multipliers 129, where the signals are multiplied by the cosine and sine of the scan angle respectively, and thence to the feedback summing amplifier 123, as noted above.

The sine cosine generator 130, mechanically connected to the rotating shaft of the memory drum 33 driven by motor 147, supplies signals representing the sine, cosine functions of the angle between the scanner slit position and the gimbal axes. Outputs are used from this sine cosine generator 130 only when the MST is used for reconnaissance and there is no missile interface connection.

When in either the aiming tracking or missile follow tracking mode the switches 131 select the sine cosine data as provided from the missile. The correlator output data is used by the gimbal servo as one of the several inputs in the continuous realignment of the optical axis. The servo amplifiers 127 in the MST system shown in FIG. 10b are current amplifiers which deliver a proportional amount of current for various input voltages. The D.C. torquers 128, which rotate the gimbals 14 and 16, are driven by the amplifiers 127. The summing amplifiers 126 also receive signals from the pitch and yaw rate gyros 132, which operate as part of a closed loop to provide damping and stabilization. In addition to these signals, there is also a boresight alignment potentiometer 133, signal applied to the summing amplifiers 126, an input from the hand control 134 in the cockpit, and pitch yaw microsyn 135, feedback signals. Gates 136 switch the outputs of boresight alignment potentiometers 133, and the pitch-yaw microsyns 135, to the summing amplifiers 126, when in the electrical cage mode.

In the aiming inertial mode the output of the hand control 134 of the Operator Hand Control is used in the summing amplifier 126 as a rate input. In the aiming tracking mode the hand control 134 output is used in the summing amplifier 126 primarily as a position input. The hand control 134 is located in the pilot or operator's compartment of the aircraft or other vehicle, and is the means by which the pilot or operator steers the MST gimbal assembly 12 to a prescribed point of the scene. This output of hand control 134 is sent via pitch and yaw gain changers 151 to summing amplifiers 126. The gain is changed to compensate for optical field of view gain change. In addition, the output of the hand control 134 is sent to level detectors 137 through pitch and yaw gates 150, where it is compared to a preset threshold which, when exceeded, causes level logic 140 to open gate 141, permitting pulses from square wave oscillator 138 to reach rememorization logic 142, which in turn causes the read write logic 143 to control the rear write amplifiers, 139 and 121.

The rememorization rate is determined by the free running frequency of oscillator 138. The write amplifiers 121 and read amplifiers 139 associated with the memory drum 33, are cross coupled so as to operate alternately, such that, for example, when write amplifier A is writing live data on say track No. 1 of the memory drum 33, the previously recorded data on track No. 2, is being read by read amplifier B. The operation of these amplifiers is switched at the time of rememorization.

The read amplifiers 139 send signals through gate 159 to the summer 158 and then to the correlation logic 119, and correlation detector 120, where it is used as old data. As mentioned earlier, the output of digital filter 117 is sent to the correlation detector 120 which can also cause rememorization by means of rememorization logic 142. The rememorization pulse is generated when a certain degree of decorrelation of the live data and the reference data being compared in the correlation detector 120 is reached.

The above logic causes the MST 10 to operate in a combination position rate mode, thus allowing the operator to steer the MST gimbals 12 while this rememorization procedure is occurring. When rememorization does not take place, any input the operator applies will be nulled out by the outputs of the correlator pitch yaw integrators 124. The rememorization rate has been selected to provide the operator with optimum control to steer the MST gimbal assembly 12 to a particular target in the minimum time and with minimum error.

The thumb switch 161 located on the hand control 134, is used to select fields of view, to select operating modes, and to initiate the transfer of reference data to the missile.

Fields of view are selected by inputs to the field of view logic 153, from three sources. First, the thumb switch 161 actuation will select either the 9°, 1.8° or 0.6° field of view for TV viewing of the scene. Next, the thumb switch 161 will initiate the transfer of reference data to the missile by triggering the event sequence logic 152, which at the proper count or state will in turn start the automatic field of view sequencer 145, which commands the proper sequence of fields of view by means of field of view logic 153. Lastly, in the missile follow tracking mode, the existence of live data from the missile in the old data logic 156, causes gate 155, to pass missile field of view size data to the field of view logic 153 which causes the MST field of view to match that of the missile.

The thumb switch 161 controls the MST operating modes by establishing a digital count in the event sequence logic 152. With a zero count the gimbals 14 and 16 are in the electrical cage position. On the count of one, the event sequence logic causes the mode control logic 154 to open gates 136, placing the MST in the aiming inertial mode. At this point a store command, i.e., transfer reference data to missile, could be generated by going to a count of two in the event sequence logic 152, since it would start the automatic field of view sequencer 145, and by opening gates 150 and 125. However, prior to going to a store command, thumb switch actuation can send a signal to mode control logic 154, which will place the MST in the aiming tracking mode for a final position adjustment prior to initiating a store command. If a count of three is made in the event sequence logic 152, the MST is reset in the electrical cage position.

After the operator has positioned the cross hairs of reticle assembly 50 of FIG. 2 on the desired target, the automatic process of transferring the MST scans to the missile is carried out by the field of view sequencer 145 in the following manner: the MST system at the beginning of the automatic process is in the 1.8° field of view as determined by shutters 64, 66 and Shoch shutter 68. The first pattern or scan is allowed approximately 25 milliseconds to take place, this period being determined by a preset one shot. At the trailing edge of this pulse, a second one shot initiates the second sequence, which is a 4° field of view scan, the time being allowed for this scan being 100 milliseconds. The trailing edge of this second one shot initiates a third one shot which initiates the third sequence, the 20° field of view scan, which is also allowed 100 milliseconds for the scan. In a similar manner a fourth one shot initiates the last scan which is the 9° field of view. Similarly the last scan is allowed 100 milliseconds. The process as described accumulates approximately 325 milliseconds. The end of each pulse or the trailing edge of each pulse is sent to the missile as an event signal which describes the end of the previous event and the beginning of the next event. Therefore, the missile memory logic is in the proper state to store the scans on the correct memory tracks. The third reference scan of the MST scanner, namely the 20° field of view, is reverted to after the last trailing edge of the last pulse has been sent to the missile, therefore enabling the MST system to be in the proper field of view for the missile follow tracking mode.

Summarizing, the following signals and commands are received from the missile in the missile follow tracking mode.

1. The digital quantized live scene data is received in the old data logic 156, which in turn causes the gate 157 to pass this data to the summer 158. The summer sends the data to the correlation detector 120 and correlation logic 119, where it is used as reference data. The old data logic 156 opens gate 159, preventing data from read amplifiers 139 from reaching the summer.

2. Field of view signal to gate 155, which describes whether the missile is in a 20° field of view or a 4° field of view.

3. A missile memory sync signal to sync control 149 for synchronizing the MST memory drum with the missile memory drum.

4. A missile slit sync signal to sync control 148 from the missile roll gyro resolver which is used to synchronize the MST slit with the missile rotating slit. This signal SIN ($\theta + \phi$) is also applied to the yaw multipliers 124 and 129 in the correlator electronics, where $\theta$ is the angle between the slit position and the gimbal axes and $\phi$ is the roll angle generated subsequent to the uncaging of the roll gyro in the missile which occurs at the store command.

5. The signal cos ($\theta + \phi$) which also has been provided by the roll gyro resolver is applied to the pitch multipliers.

General Operation

In general, the operation of the MST system is as follows. As the pilot approaches the target, the MST system is in the electrical cage mode. In this particular mode, the MST gimbal system is in a closed position loop and closed rate loop operation. The gimbal system is nulled to a heading which is that of the aircraft. The operator has, at his command, boresight controls which can trim the position heading of the MST system to that of the airplane. In addition, the closed loop television system is in the 9° field of view. Also, the MST scanner or rotating aperture is synchronized to the missile slit and the MST memory drum is synchronized to the missile drum. The missile tracker gimbals are also electronically slaved to the MST gimbal assembly by comparing the MST gimbal position signal to that of the corresponding missile gimbal position and using the difference to drive the missile gimbal system to the same heading as that of the MST gimbal.

The next sequence is for the operator to switch from the electronically caged position to the aiming inertial mode. During this mode of operation, the position loop in the MST servo is opened and allows rate tracking to take place. The operator's hand control position is the signal by which the servo system is actuated to position the MST gimbal. The motion or sequence of events is controlled by the thumb switch on the hand control stick. The thumb switch is a combination of four single pole switches arranged in a quadrant fashion, such that when the switch is manipulated toward the 3 o'clock, 12 o'clock, or 9 o'clock positions, certain events take place. The activations which occur in the 3 o'clock position are decoded by a series of decode networks, namely flip flops, to sequence the fields of view by controlling the baffles and Shoch shutter positions as well as the electronic gains from the hand control to the servo summing amplifier and the electronic magnification. The manipulation in the 12 o'clock direction switches the MST system to the aiming tracking mode. Manipulation of the thumb switch to the 9 o'clock position is decoded by a series of flip flops to command the system into the tracking modes, cage mode, and the store mode used for obtaining the references.

The operator, having placed the system in the aiming inertial mode, will sequence the system to the 1.8° field of view as viewed on the closed loop television viewer. This is accomplished by switching the baffle 64 in the large focal length path to the open position. The viewer will now have the benefit of an optical increase in magnification of 5 to 1 as viewed on the monitor; see FIG. 9. At this particular time, the operator will switch the MST system to the aiming tracking mode which activates the correlation electronics to be used as a position tracking system. If the output of the hand control is not above a prescribed voltage threshold, the correlator servo will position the heading of the gimbal to match the position as called for by the hand control. In other words, the gimbals will be moved off the reference aim point such that the correlator output signal just cancels the hand control output signal. If the operator must move the cross hairs (provided by device 50) over a large angle to reach the target, the movement of the hand control should exceed the prescribed threshold as set by the level detectors to cause rapid rememorization; the servo loop then acting as a rate control loop. When the cross hairs reach the target position, the hand control is repositioned to cause its output to drop below the threshold, thereby going into the position control mode. The final precision aiming just prior to the store command will be performed in the position mode.

In most cases, the final precision aiming will be made with the system in the 0.6° field of view, obtained by underscanning. Since underscanning in effect makes possible a three fold magnification, this plus the aforementioned optical increase results in a magnification of the scene of 15 to 1.

During the sequence of events when the viewing system is changing fields of view, the total system gain, i.e., detected motion in the display related to hand control movement, remains constant, This is accomplished by changing the scale factor of the output of the hand control as related to its movement. Therefore, the same hand motion in either field of view will command the same relative motion in the monitor. When the cross hairs are on the intended target and stable with respect to visual viewing, the operator would then sequence the system to the automatic store mode which would automatically sequence the scanner to obtain the four scans for the missile. This is accomplished by a series of one shots which run to prescribed time lengths and are serially controlled. The total events would have a time lapse of approximately 325 milliseconds, as previously mentioned.

During this sequence of events, the coil 44 of the Shoch shutter is activated twice, and the rotary solenoids associated with the shutters are activated one time. The sequence begins when the MST is in the 1.8° field of view insofar as the rotating aperture is concerned, thereby requiring only three different activations of the control mechanism, which of course includes the Shoch shutter and the baffles.

The four scans are transferred to the missile system and sequence of event pulses are supplied to the missile system for storing the multiple references on the proper missile memory tracks. These details were set forth at length in the PACT invention of Emmons et al., previously cited.

If simulated missile flight, i.e., captive flight, is desired, the MST goes to the missile follow tracking mode, after the missile system has acquired the digitized data from the scanner and has achieved a lock-on in the 20° field of view. At this time, the missile system will send a tracking signal to the MST scanner which will reset the optical system to the 20° field of view and will also switch the MST system to the missile follow mode, i.e., sequence the logic of the MST system to be commanded by the missile. When the missile switches to the 4° field of view, the MST system will receive a signal which will switch the optical system of the MST to the 4° field of view and continue tracking. These events will take place as the operator maneuvers the aircraft on a prescribed flight path toward the target. This flight path will simulate missile environment and during this time the MST scanner will acqure video data of the missile tracker aiming during the simulated flight. The pilot or operator will have the opportunity to switch the video recording system to the underscan position which will enable the video recorder to view the 0.6° and 3.0° fields of view. After the operator has completed the simulated missile flight and is turning away from the target, the MST system is reset to the electrical cage position by manipulating the thumb switch to the 9 o'clock position, which causes a reset of all of the counting flip flops and correlator logic to the initial electrical cage position.

DETAILED DESCRIPTION OF FIG. 11

It should be noted that when a Store Down Stream embodiment is utilized with MST invention the remote memory and scanning slit of the MST must be synchronized with their comparable components in the missile; note FIG. 11. When the missile is in free flight in the Store Down Stream mode and not under a precise roll control, a roll gyro with resolver outputs must be employed to determine any missile roll deviation from its roll position when the MST generated references were stored prior to its launch from the aircraft. The above mentioned roll deviation is inserted as an angular phase shift between the remote memory and the scanner slit. For example, this operation will cause the scanner slit to see the 12 o'clock position of the earth scene at the same instant that the remote memory read head which has rotated with the missile senses the memory pulse corresponding to the 12 o'clock position in earth coordinates. Thus, this arrangement makes unnecessary the employment of a tracker roll gimbal with its associated drive torquers and servo electronics. Furthermore since the prestored references were made at the roll orientation prior to launch, said orientation has been maintained by use of the roll angle phase shift generated by the gyro such that the prestored reference pulses are read out of the memory at the same instant that the scanner slit is viewing the appropriate portion of the earth scene.

We have found by simulation that the high inertia component of the synchronizing system (minimum coupling with the airframe) should be regarded as the "master" component for minimizing errors in synchronization under missile roll acceleration transients. Therefore, as seen in FIG. 11, the missile memory drum is to be regarded as the master.

The sync circuit of the missile is responsible for keeping the missile slit in sync with the missile memory drum, and in a similar manner, the sync circuits in the MST pod keep their respective slit and drum in sync with their counterparts in the missile.

The television system referred to hereinbefore is comprised of one similar to that of the Walleye integrated circuit model developed by the Martin Marietta Corporation for the Navy under a contract. The television system for MST does not contain optical tracker electronics or servo electronics and has an additional feature of an underscanner electronic circuit which allows for underscanning of the vidicon. No invention in any of the television electronics is claimed by the present inventors.

We claim:

1. A multiple field of view electro optical device comprising a controllable rate stabilized gimbaled housing in which a pair of objective lenses are mounted, said lenses having coincident axes and having partially independent optical paths each leading to the same television vidicon tube, said vidicon tube being arranged to receive light entering from either of said lenses, selectively positionable means for preventing light from more than one lens at any given moment from reaching said vidicon tube, said vidicon tube having an output representative of the scene beheld by said lenses, said output passing to a television display system, and a correlation tracker embodying a rotating mechanical scanner, to which light from one or the other of said lenses is selectively directed, said tracker functioning to provide more precise position stabilization of the optical axis with respect to a target scene.

2. A multiple field of view electro optical device comprising a controllable rate stabilized gimbaled housing in which a pair of objective lenses are mounted, said lenses having coincident axes and having partially independent optical paths each leading to the same television vidicon tube, said vidicon tube being arranged to receive light entering from either of said lenses, selectively positionable means for preventing light from more than one lens at any given moment from reaching said vidicon tube, said vidicon tube having an output representative of the scene beheld by said lenses, said output passing to a television display system, and a correlation tracker, said tracker comprising a rotating scanner mounted in said gimbaled housing, and arranged to receive light from one or the other of said lenses, the light passing through said scanner being directed to a photodetector, said photodetector serving to convert the light into a voltage signal analogous to the light passing through said scanner, said voltage signal being correlated with voltage signals received from subsequent scans to provide error voltages for more precise position stabilization of the optical axis with respect to a target scene.

3. The device as defined in claim 2 in which the initial positioning of the gimballed housing is determined by data from other scene sensing devices.

4. A multiple field of view electro optical device comprising a controllable rate stabilized gimbaled housing in which a pair of objective lenses are mounted, said lenses having coincident axes and having partially independent optical paths each leading to the same television vidicon, said vidicon being arranged to receive light entering from either of said lenses, selectively positionable means for preventing light from more than one lens at any given moment from reaching said vidicon, said vidicon having an output representative of the scene beheld by said lenses, said output passing to a television display system indicating a desired aimpoint; said optical paths each leading to the same rotating scanner mounted in said gimballed housing, the light passing through said scanner being directed to a photo-detector, said photodetector serving to convert the light into a voltage signal analogous to the light passing through said scanner, which voltage signals are processed to represent a plurality of related signals representing the immediate appearance of the target scene at successively closer ranges to the desired aimpoint, said processed signals being delivered to the prestored area correlation tracker in a missile.

5. The device as defined in claim 4 in conjunction with synchronization means for assuring that scanners in said gimballed housing and in the missile rotate in phased relation.

6. The device as defined in claim 4 with which a correlation tracker is utilized, said tracker comprising said rotating scanner mounted in said gimbaled housing, and being arranged to receive light from one or the other of said lenses, the light passing through said scanner being directed to said photodetector serving to convert the light into the voltage signal analogous to the light passing through said scanner, said voltage signal being correlated with voltage signals received from subsequent scans to provide error voltages for more precise position stabilization of the optical axis with respect to a target scene.

7. The device as defined in claim 5 in which the initial positioning of the gimballed housing is determined by data from other scene sensing devices.

8. A multiple field of view electro optical device comprising a controllable gimballed housing in which a pair of objective lenses are mounted, said lenses having coincident axes and having partially independent optical paths each leading to the same television vidicon, said vidicon being arranged to receive light entering from either of said lenses, selectively positionable means for preventing light from more than one lens at any given moment from reaching said vidicon, said vidicone having an out put representative of the scene beheld by said lenses, said output passing to a television display system indicating a desired aimpoint; said optical paths also leading to a correlation tracker having a rotating scanner mounted in said gimbal housing, said scanner arranged to receive light from one or the other of said lenses, the light passing through said scanner being directed to a photodetector, said photodetector serving to convert the light into a voltage signal analogous to the light passing through said scanner, said voltage signals being correlated with voltage signals received from the prestored area correlator tracker in a captive missile for continuous aligning of the said gimbals with respect to the prestored area correlator tracker in such captive missile.

9. The device as defined in claim 4 in which at least one optical mask is utilized, said mask being located at an image plane in an optical path, said optical path leading to said rotating scanner, said mask serving to control the radii of the scanned scene such that an elliptical shape is scanned, thus causing said voltage signals being processed to accurately represent the immediate appearance of the target scene at the successively closer ranges to the desired aim point.

10. The device as defined in claim 4 in which a correlation tracker is utilized, said tracker comprising said rotating scanner mounted in said gimbaled housing, and being arranged to receive light from one or the other of said lenses, and at least one optical mask utilized to control the radii of the scene scanned by said rotating scanner, such that an elliptical shape is scanned.

11. An electromechanical optical device utilizing at least one optical path through which light indicative of a target scene can be manifested, a photosensitive device positioned with respect to said optical path such that the light falls thereon, said photosensitive device, as a result of such light, generating voltage analogs of the incoming light, means for processing such voltage analogs in order to extract positional information usable for controlling the position of said electromechanical optical device, and means for deriving data representative of such voltage analogs of the incoming light, in order to provide successive, concentric references related to the target scene.

12. An electromechanical optical device for providing a series of references relatable with a target scene to a missile that not only has a memory for storing such references, but also which has means for sequentially using such references in guiding the missile to such target scene, said electromechanical optical device comprising at least one optical path through which light indicative of the target scene can be conducted to a photosensitive device, said photosensitive device being capable of providing a voltage analog of such incoming light, means for processing such voltage analog information in order to provide digitized information for controlling the positioning of the electromechanical optical device, means for deriving a plurality of voltage analogs representing a succession of concentric scenes at predetermined ranges to the target, and means for delivering digitized data derived from such voltage analogs to a missile so that such digitized data can be used in a pre-established order for guiding the missile to the target.

13. The electromechanical optical device as defined in claim 12 in which a vidicon is utilized, means for conducting light indicative of the target scene to said vidicon, and a display device connected to said vidicon, such that an operator can view a representation of the same target scene from which the voltage analogs representative of the target scene are derived.

14. An arrangement for providing a positioning function in response to a pair of inputs, each of which inputs is derived from a respective optical device arranged to have a line of sight to substantially the same area or scene, the first of such devices having means for performing a scanning function and for converting the scene it views into voltage signals, the second device being gimbaled, and positionable by servo means, said second device not only having means for performing a scanning function upon substantially the same scene as viewed by said first device and for converting such scene into voltage signals, but also serving to compare the two sets of voltage signals so as to determine the spatial difference between the lines of sight of the two devices as represented by said voltage signals, and means utilizing error signals representative of such differences for operating the servo means of said second device to move the line of sight of latter device in the appropriate direction so as to minimize the differences between the two voltage signals, thereby precisely pointing said second device at the same scene as viewed by said first device, independent of any mechanical or structural interconnection between the two devices.

15. The arrangement for providing a positioning function as defined in claim 14 in which said first optical device has a plurality of focal lengths, providing different fields of view, and said second optical device has a plurality of focal lengths, providing fields of view matching those of said first optical device, and means in said second device for selecting at any given instant, the appropriate focal length in order to match the focal length being used in said first device.

16. The arrangement for providing a positioning function as defined in claim 14 in which the scene as viewed by said second device is presented to a vidicon, latter device making possible the immediate observation of such scene.

17. The arrangement for providing a positioning function as defined in claim 14 in which a vidicon is used, said vidicon having as its input, the scene as viewed by the second device, said vidicon serving to provide as an output, an optical indication of the scene, and recording means attached to said vidicon for permanently storing a representation of gimbal positions over a period of time.

* * * * *